Patented Sept. 17, 1929

1,728,807

UNITED STATES PATENT OFFICE

CARL GUSTAV SCHWALBE, OF EBERSWALDE, GERMANY

METHOD OF CARBONIZING A CELLULOSE-CONTAINING SUBSTANCE SUCH AS WOOD, PEAT, AND THE LIKE

No Drawing. Application filed June 24, 1924, Serial No. 722,157, and in Germany June 25, 1923.

My invention relates to the art of carbonizing cellulose-containing substance such as wood, peat in a dry or humid state and the like, and more particularly to the wet or humid method of distilling wood, peat and the like for the purpose of carbonizing the same.

In the usual dry process of distilling wood, the wood and the substances produced therefrom by the process are unavoidably overheated and deteriorated in consequence of the low heat conductivity of the wood and in particular of the air enclosed in and surrounding the particles of the wood.

I am aware of the fact that suggestions have been made heretofore to produce charcoal from wood in an aqueous or humid medium, but a very high pressure of 100 to 200 atm. is to be employed for the purpose so that the process is objectionable for economical reasons.

I have discovered, after much study and research, that I can produce charcoal from wood, peat and similar cellulose substances with the aid of a by far inferior pressure, say of 8 to 15 atm., or still less, and in the humid way by soaking the cellulose-containing substance with a salt solution, preferably with the addition of a small quantity of a suitable acid or acids, preferably a mineral acid, such as hydro-chloric or sulphuric acid and heating the thus impregnated material at a temperature below 360° C.

Wherever the limitation such as "suitable mineral acid" or the limitation "mineral acid" is employed, it is intended to designate a non-oxidizing mineral acid which can form soluble salts with an alkali-earth metals. Wherever "salt solution" is employed it is intended to designate a solution of a non-oxidizing salt of a metal of the alkali or alkali-earth group.

For example I treat in this way some kind of wood, that is to say, I soak the wood with a concentrated salt solution and heat the soaked wood at a temperature of 180° to 210° C., and at a pressure of 8 to 9 atm. for some time whereby the wood will be completely carbonized. I have even found that if the heating period is continued over a greater length of time, a heating temperature of 150° C. will be sufficient to initiate a carbonizing effect.

In case of heating the soaked cellulose-containing substances at a temperature of 180° to 210° C., as above exemplified, no tar is obtained, but aqueous distillates only are recovered which are rich in acetic acid and methyl alcohol. The yield in acetic acid and methyl alcohol is highly in excess to that obtained by the usual dry distillation of wood.

My improved method is not confined to the carbonization of wood and peat only but any kind of cellulose-containing substances inclusive of waste and rubbish of vegetable nature may be treated according to my invention with a view to obtain a charcoal-like solid product and high-valued organic by-products of liquid or volatile nature. I wish it, however, to be understood that my improved method is applicable, and intended in the first line for the production of charcoal and inherent by-products from waste-wood and peat, it being obvious that the latter comprises dry peat and naturally wet peat.

As regards waste-wood such as waste of a timberyard, chips, clippings and the like, I soak e. g. the chips thoroughly with a salt solution, such as a solution of calcium chloride or waste lye resulting in the manufacture of potassium chloride from minerals containing chiefly potassium chloride and magnesium chloride so that the final waste lye is an impure solution of magnesium chloride and calcium chloride, and if required—which depends on the quality and nature of the wood—I add thereto a small amount of a suitable acid such as muriatic acid or sulphuric acid, say 1% of the weight of the chips, whereupon I heat the soaked material in an appropriate vessel under pressure until a complete carbonization is brought about.

The following examples are given to disclose the specific proportions.

*Example 1.*—100 parts by weight of sawdust, wood chips, or the like are mixed in a container with 400 parts by weight of a magnesium chloride solution containing 35 parts by weight of magnesium chloride in 100 parts water, the mixture is heated up to 100° C.

until the wood particles are completely soaked with the solution. Subsequently the thus treated wood particles are heated in the container together with the liquor in excess of a temperature of 180° C., the heating being effected by means of a coiled steam pipe and with the cover of the container closed, so that a pressure of less than 15 atmospheres will be produced therein, whereupon a small amount of steam will be allowed to escape through a valve-controlled pipe provided for the purpose in the container, and caused to condense. The distilling process is continued for about 8 hours that is until about one fourth of the quantity of water contained in the vessel has been distilled off. After said 8 hours the pressure is completely relieved by opening the valve, the residual solution is discharged through a valve provided in the bottom of the vessel, and the carbonaceous substance resulting from the operation is lixiviated or washed with warm water to remove all salt therefrom.

The discharged or recovered salt solution and the washing water may be used in a next operation. The distillate is to be worked into acetate of calcium and methyl alcohol in the usual manner.

*Example 2.*—100 parts by weight of wood chips, saw-dust or the like are mixed in a suitable, valve-controlled container with 400 parts by weight of a calcium chloride solution containing 40 parts by weight of the calcium salt to 100 parts by weight of water and 1 part by weight of sulphuric acid are added to the mixture.

The heating and distilling operation is then effected in the same manner as described in Example 1 and similar results are obtained.

It will be noted from the above that the salt solution is not removed during heating and the calcium acetate or methyl alcohol are produced during the carbonizing of the materials.

It will be evident that my invention, whilst still being adhered to in its main essentials, may be varied and adapted in many ways, according to the several requirements desired, or most suitable under different circumstances without departing from the spirit of the invention or sacrificing any of the advantages thereof.

A salt of the non-oxidizing mineral acid employed in connection with the process is formed of a non-oxidizing mineral acid and a metal of the alkali or alkali earth group. Where the limitation "metal of the alkali group" is employed, it is intended to cover both the metals of the alkali and the alkali earth group.

What I claim is:—

1. The wet method of carbonizing cellulose-containing substance including waste wood and peat, consisting in thoroughly soaking the said material with a concentrated solution of a non-oxidizing mineral acid salt of a metal of the alkali group, adding thereto a small quantity of a non-oxidizing mineral acid, which forms a soluble salt with the added salts, and heating the mixture thus formed at a pressure of less than 15 atmospheres until the said cellulose-containing material is carbonized.

2. The wet method of carbonizing cellulose-containing substance including waste wood and peat, consisting in thoroughly soaking the said material with a concentrated solution of a non-oxidizing mineral acid salt of a metal of the alkali group, adding thereto a small quantity of a non-oxidizing mineral acid, which forms a soluble salt with the added salts, and heating the mixture thus formed at a pressure between eight and seven atmospheres, until the said cellulose-containing material is carbonized.

3. The wet method of carbonizing cellulose-containing substance including waste wood and peat consisting in thoroughly soaking the said material with a concentrated solution of calcium-chloride, adding thereto a small amount of hydro-chloric acid and heating the mixture thus formed at a pressure of less than fifteen atmospheres until the said cellulose-containing material is carbonized.

In testimony whereof I affix my signature.

CARL GUSTAV SCHWALBE.